United States Patent [19]
Ching et al.

[11] 4,095,052
[45] June 13, 1978

[54] DIGITAL SPEECH INTERPOLATION TRUNK PRIORITY ROTATOR

[75] Inventors: Yau-Chau Ching, Morganville; David Gavin Messerschmitt, Middletown, both of N.J.

[73] Assignee: Bell Telephone Laboratories, Incorporated, Murray Hill, N.J.

[21] Appl. No.: 821,242

[22] Filed: Aug. 2, 1977

[51] Int. Cl.² .............................................. H04J 6/02
[52] U.S. Cl. .................................................. 179/15 AS
[58] Field of Search ........ 179/15 AS, 15 BW, 15 BA, 179/15 BS

[56] References Cited

U.S. PATENT DOCUMENTS

| 3,927,268 | 12/1975 | Sciulli | 179/15 AS |
| 3,997,729 | 12/1976 | Costales | 179/15 AS |
| 4,002,841 | 1/1977 | Ching | 179/15 AS |
| 4,048,447 | 9/1977 | Maruta | 179/15 AS |

Primary Examiner—David L. Stewart
Attorney, Agent, or Firm—Richard J. Roddy

[57] ABSTRACT

In a digital speech interpolation system, speech inactivity time is utilized to reduce the bit rate on a link between transmitter and receiver by compressing digital characters from a plurality of trunks onto a lesser plurality of channels. If the number of trunks having active speech samples exceeds the number of channels, an overload may exist. To mitigate overload, it is common to truncate one or more bits from a transmitted character. However, bit truncation leads to signal degradation. Of course, it is desirable to abate the degradation consistent with mitigating the overload. Unfortunately, the number of bits truncated from a character on a first trunk is typically more or less than the number of bits truncated from a character on a second trunk. As a result, the signal degradation may not be uniform. To obtain a more uniform signal degradation, the instant priority rotation arrangement rotates the starting point for assigning bits to a digital frame responsive to the activity status of the trunks. Specifically, an active trunk is assigned to one of a plurality of groups of trunks. The starting point is taken from a different group for each output frame. Thereby, the starting point is adaptively adjusted on a frame-by-frame basis according to which trunks are active during the frame. By so rotating the starting point among active trunks rather than among all trunks, the instant arrangement achieves a more uniform signal degradation during periods of overload than was obtained with the prior art.

6 Claims, 6 Drawing Figures

DIGITAL SPEECH INTERPOLATION TRUNK PRIORITY ROTATOR

BACKGROUND OF THE INVENTION

This invention relates to digital communication systems and, more particularly, to apparatus for mitigating digital signal degradation during system overload.

In the digital communication system disclosed in U.S. Pat. No. 4,002,841, issued Jan. 11, 1977 to Y. C. Ching et al. and entitled "Data Compression Using Nearly Instantaneous Companding in a Digital Speech Interpolation System", inactivity time is utilized to reduce the bit rate on a link between transmitter and receiver by compressing digital characters from a plurality of trunks onto a lesser plurality of channels. If the number of trunks having, for example, active speech or data samples, as detected by a speech or data detector, exceeds the number of channels, an overload may exist. During overload, it is common to truncate a bit from a transmitted character. By so reducing the number of bits employed to encode the sample, the effective number of channels on the link can be increased. However, bit truncation leads to signal degradation. The prior art mitigates some deleterious effects of overload by a priority trunk rotation arrangement. In particular, the order of assigning, for example, active speech samples from trunks to channels is rotated among all trunks, thereby achieving a structured control over the signal degradation as bits are truncated during overload. Unfortunately, the degradation to signals from one trunk may not be uniform when compared with the degradation to signals from a second trunk. To illustrate this nonuniformity, we offer the following partial review of the prior art.

Digital characters can be multiplexed into a time slot of a 193-bit frame and the frame can be provided to one of a plurality of, for example to one of eight, input terminals of a digital transmitter. The frame, usually provided at a nominal bit rate of 1.544 Mb/s, typically includes a one-bit framing signal and a plurality of eight-bit characters, each character representing, for example, a speech sample from a different one of a plurality of different trunks, typically 24 trunks. For ease of description, it is assumed that an input frame is provided concurrently to each input terminal of the transmitter. Hence, the system is assumed able to process characters from the (24 × 8 =) 192 trunks in about 125 microseconds, that time being related to the reciprocal of the input bit rate. The processing includes the development of an output multiframe to be provided to a transmitter output terminal for transmission to the receiver at a nominal bit rate of about 3.152 Mb/s. One output multiframe includes 24 output frames, each output frame having a format somewhat different than the format of an input frame. Specifically, a 394-bit output frame includes a four-bit framing signal, a 24-bit status field, and a 366-bit data field. Hence, the time to transmit an output frame is also about (394 bits ÷ 3.152 Mb/s =) 125 microseconds.

The status field of an output frame is for signalling the activity status for each of eight trunks, while the data field is for interleaving bits of digital characters from up to 1192 active trunks. In interleaving, a first bit from a first character is assigned to the data field, followed by a first bit from a second character, etc. The resultant interleaving of bits from different characters eliminates a need to precalculate the number of bits of each character. Instead, bits are interleaved until the data field is full, which typically occurs during overload, or until all bits of a character from each active trunk have been transmitted, whichever event occurs first.

During overload, a character from one trunk, whether it be a speech sample or a data sample, may have truncated therefrom more or less bits than a character from another trunk. As a result, the fewer bit signal is more severly degraded than a signal having less bits truncated. To mitigate this problem, the prior art teaches a priority rotation arrangement wherein the order of assigning bits for interleaving in the data field is rotated relative to all trunks, whether active or inactive. For example, the trunk activity status for input trunks 25-32 may be signalled in the status field of frame 4 of the output multiframe, while the activity status for input trunks 161-168 may be signalled in frame 21. The prior art ordder of assigning bits to the data field of frame 4 would be: a bit from a character on trunk 25 is first assigned to the data field, if trunk 25 is active; else, a bit from a character on the first active trunk taking the trunks in the increasing trunk sequence 26 through 192, wrapping around to trunks 1 through 24. Similarly, in frame 21, the prior art teaches the assigning as starting with trunk 161, if active; else with the first active trunk in the increasing trunk sequence 162 through 192, wrapping around to trunks 1 through 160. If, for purposes of illustration, we assume trunks 25 and 161 as being the only active trunks, it is clear that the prior art assigning for frame 4 would start with the first bit of the character from trunk 25. However, for each of output frames 5 through 21, the prior art rotation arrangement would start the interleaving with the first bit of the character from trunk 161. In such an event and during overload, signals from trunk 161 are typically accorded less signal degradation during each of frames 5 through 21 than would be accorded signals from another trunk. Hence, the prior art suffers from a nonuniform signal degradation problem.

Accordingly, it is a road object of the present invention to mitigate signal degradation during overload in a digital communication system.

SUMMARY OF THE INVENTION

This and other objects of our invention are achieved by improved digital communication apparatus for adaptively adjusting the assignment of a message sample to a frame, the frame for extension between a transmitter and a receiver. The adaptive adjustment obtains by rotating the starting point for assigning samples to the frame. The order of rotating is predetermined and is responsive, on a frame-by-frame basis, to trunks, which are signalled as active during the frame. In an illustrative arrangement, an active trunk is assigned to one of a plurality of groups of trunks, the manner of assignment being consistent from one frame to another frame and there being a prefixed number of groups. In adaptively adjusting the rotation, the starting point for assigning samples to a frame is taken, in a predetermined manner, to be a trunk from one of the groups. By rotating among the groups, and hence among active trunks, rather than among all trunks, the starting point is also rotated. Thereby, not only is signal degradation mitigated during overload but a substantially uniform signal degradation is obtained.

BRIEF DESCRIPTION OF THE DRAWING

Our invention should become more apparent from the following detailed description when taken in conjunction with the accompanying drawing in which.

DETAILED DESCRIPTION

Figure 1:
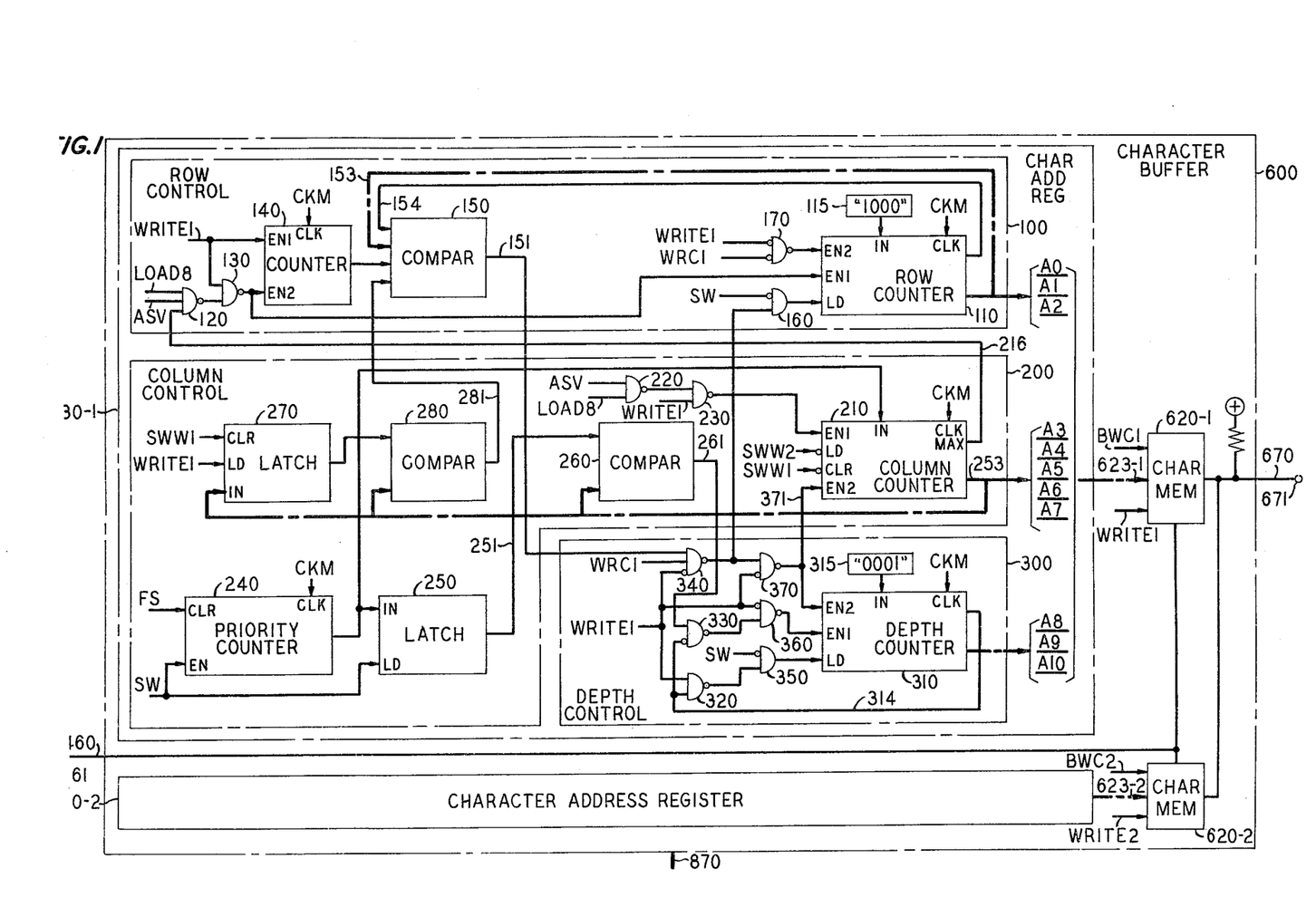
FIG. 1 illustrates a block diagram schematic of a character buffer embodying a priority rotation arrangement in accord with the principles of our invention.

An illustrative embodiment of a priority rotation arrangement in accord with the principles of our invention is included in character buffer 600, shown in the block diagram schematic of FIG. 1. Buffer 600 may be used, for example, as a character buffer of a data transmitter of the type disclosed in the aforecited U.S. Pat. No. 4,002,841, the teachings of which are incorporated herein by reference.

Broadly, in our illustrative embodiment, digital characters, serially detected at terminal 461 and typically extended thereto from trunks having active message samples, are supplied therefrom over lead 461 jointly to character memories 620-1 and 620-2 of buffer 600. The characters are buffered by being written into one of the character memories. Subsequently, the characters are read from the written memory and serially extended over lead 670 to terminal 671 for assignment to a frame. The address of a memory location, from which a character is read, may be adaptively adjusted by one of character address registers 630-1 or 630-2. Illustratively, the adjustment obtains by rotating the address of the read starting point according to which trunks are active. By so rotating the starting point among active trunks, rather than among all trunks, our arrangement achieves a more uniform signal degradation during periods of overload than was obtained with the prior art.

More particularly, illustrative buffer 600 includes random access character memories 620-1 and 620-2 for buffering a digital character from each active trunk. The size of a character memory is assumed to be 2048 bits, sufficient to buffer an eight-bit character for up to 192 active trunks. The characters are serially extended to buffer 600 over lead 460 and therein jointly to the two character memories for selective writing. The selective writing occurs by way of alternating between the two memories and by writing only characters from active trunks.

In alternating, while one character memory is being written, the other character memory is being read, the read characters being supplied over output lead 670 to terminal 671 for assignment to an output frame. The alternating write/read operation obtains responsive to clock timing signals such as the signals illustrated in FIGS. 2, 3 and 4. The timing signals may be extended from external apparatus, not shown, over cable 870 to buffer 600. Typically, the suffix "1", when appended to a timing signal identification, has the import of referencing that signal to an operation accurring in a combination of memory 620-1 and character address register 630-1. For example, when a WRITE1 timing signal is a logic one, memory 620-1 is selected for writing. Conversely, when a WRITE1 signal is a logic zero, memory 620-1 is selected for reading. Coincidental with the writing or reading of memory 620-1 is the reading or writing of memory 620-2, the latter being responsive to a WRITE2 timing signal, which happens in our illustrative embodiment to be the logical complement of the WRITE1 signal.

For each of the 192 input trunks, the digital character appearing on lead 460 may be provided from an inactive trunk. However, a character from an inactive trunk typically includes no useful information, else the trunk would probably be active. Hence, only characters from an active trunk are written into or read from a memory. Thus, not only are the memories alternately selected for writing or reading, but the memories, when selected, are also enabled for writing or reading only characters from an active trunk. In our illustrative embodiment, the activity status of a trunk is signalled by a trunk activity status signal. In particular, the trunk activity status signal, identified in FIG. 4 as the ASV signal, is a logic one if the trunk is active; otherwise it is a logic zero. A trunk is signalled to a respective memory as being active by way of a logic one BWC1 or BWC2 signal, which logic one signal is provided, when the memory is to be written, responsive to a logic one ASV signal. Thus, in our buffer 600, memory 620-1 is selected for writing during a 125-microsecond period responsive to a logic one WRITE1 signal and is enabled to be written responsive to a logic one BWC1 signal. Concurrently, memory 620-2 is selected for reading responsive to a logic zero WRITE2 signal which, as mentioned, occurs when the WRITE1 signal is a logic one.

Figure 5:
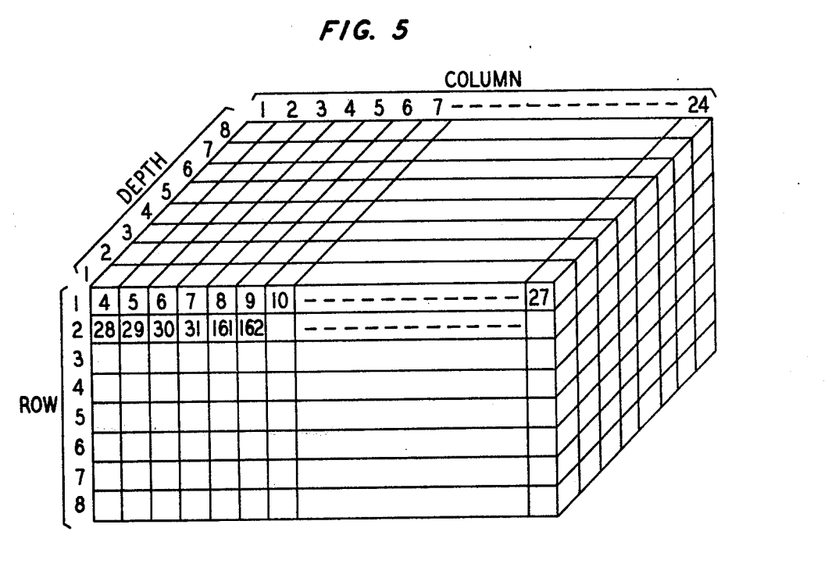
FIG. 5 illustrates a first three-dimensional array useful in describing the rotator of FIG. 1.
Figure 6:
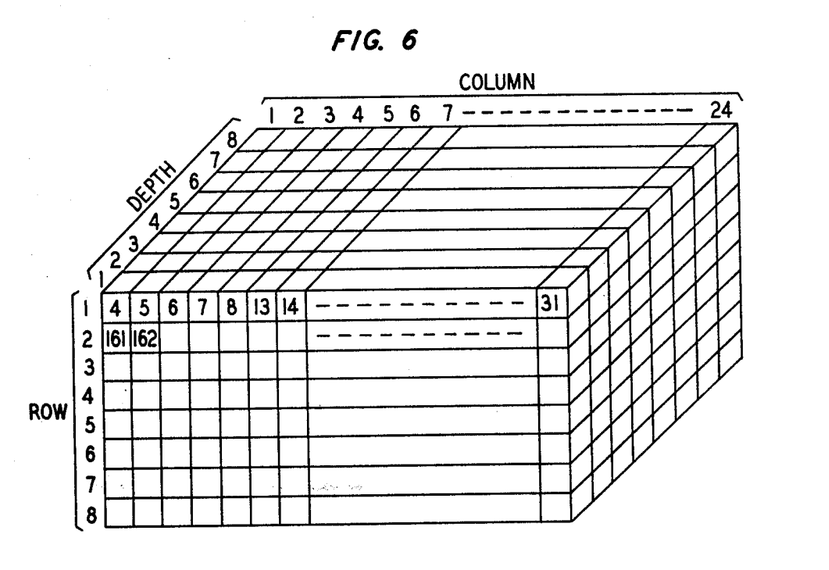
FIG. 6 illustrates a cond three-dimensional array useful in describing the rotator of FIG. 1.

The addresses of the memory locations into which or from which characters are written or read are supplied by character address registers 630-1 and 630-2, respectively, over cables 623-1 and 623-2 for memories 620-1 and 620-2. For simplicity, only register 630-1 will be described, register 630-2 being its dual. The operation of the address register may be more easily understood if described with the aid of a matrix array. We use a three-dimensional array, such as is illustrated in FIGS. 5 and 6, to describe the address registers. The three dimensions of the array are referred to, respectively, as column, row and depth. For each combination of column and row, there is a depth, which is assumed to be a distance eight, sufficient to buffer an eight-bit digital character serially detected on lead 460. Our illustrative array includes 24 columns, labeled left to right, 1 through 24 corresponding respectively to frames 1 through 24 of an output multiframe. Inasmuch as there may be 192 active trunks, the array is for buffering 192 characters. There being 192 characters our array includes eight rows, labeled top to bottom, 1 through 8.

In accord with the principles of our invention for achieving a more uniform signal degradation during perios of overload than was achieved with the prior art, digital characters are written into and read from the array in a predetermined order, which order is adaptively adjusted according to which trunks are active. As an example of writing the array and as a descriptive tool, we assume 30 trunks are active during a first frame $F_1$. Specifically, we assume that the active trunks are the 30 input trunks, which are numbered 4 through 31, 161 and 162. See, for example, the ASV and BWC1 signals for frame $F_1$ in FIG. 4. Using our example and referring to FIG. 5, the eight bits of each character are written in the array first by depth then by column, then by row. That is, a digital character for each of active trunks 4 through 31, 161 and 162 is depth-wise written in the array, the eight bits of the first character, i.e., the character from trunk 4, being depth-wise written at column 1, row 1. After the first character, the writing progresses in a column-wise direction left to right, overflowing to another row, if required. Specifically, for the first 24 active trunks, i.e., trunks numbered 4 through 27, characters are depth-wise written in row 1, respectively in columns 1 through 24. After row 1 and for the remaining six active trunks, the writing overflows to row 2 where the depth-wise writing progresses to columns 1 through 6. Hence, row 2 in the last written row and column 6 is the last written column. It is noted that not all columns are written in the last written row. From the above and in general, the writing progresses in a column-wise direction within each row until a character from each of the active trunks has been written in the array.

In alternating, the memory thus written is read during the next frame for transmission to the receiver. For sake of discussion, we assume the characters written during frame $F_1$ are read and transmitted in the first frame of the output multiframe. In reading the array, digital characters are read in a predetermined order, assigned and interleaved in an output frame for transmission to the receiver. Referring to the array illustrated in FIG. 5 for frame $F_1$, the trunk number of the active trunk having a character depth-wise written at each row/column combination is there labelled in rows 1 and 2 for the assumed 30 active trunks. Thus each column includes a group of active trunks and each active trunk is assigned to one of a prefixed, here 24, number of groups. To obtain a more uniform signal degradation, bits of a character are read first by row, then by column, then by depth. It may be noted that, respecting the three dimensions of the array, the reading sequence is opposite to the writing sequence. Also, in frame $F_1$, the read starting point is the trunk in row 1 of the first group of active trunks, here the group of trunks in column 1. Specifically, in frame $F_1$, bit one of the character from trunk 4 is the first bit read from the array, i.e., the read starting point for assigning bits to the data field of frame $F_1$ is column 1, row 1, depth 1. Next, bit one of the character from trunk 28 is read from the array, i.e., column 1, row 2, depth 1. Inasmuch as there are no more trunks in the first group, i.e., there are no active trunk characters depth-wise written in rows 3-8 of column 1, the read sequence overflows to the second group of trunks, i.e., to column 2, row 1 where the next bit read is bit one of the character from trunk 5, to be followed by bit one of the character from trunk 29, etc. After bit one has been read and assigned for all the written characters, bit two of the character is read and assigned in the same predetermined order of trunks. Then bit three, et cetera. In summary, on a row-by-column-by-depth basis up to eight bits of a character are read from the array and assigned for interleaving in the first frame of the output multiframe, the reading occurring in the following predetermined order of active trunks: 4, 28, 5, 29, 6, 30, 7, 31, 8, 161, 9, 162, 10, 11 through 27. Such exemplifies the predetermined order of reading bits of characters from the array and assigning same for interleaving into frame $F_1$.

In regard to reading and interleaving for the second frame of the output multiframe, it will be remembered that, stemming from the alternate writing and reading of memories and assuming characters for the first output frame are read from memory 620-1, characters to be interleaved in second frame are written into and read from memory 620-2. Also, as aforementioned, the trunk activity status for eight trunks is signalled in the status field of each of the 24 output frames. Thus, the activity status of each of the 192 trunks is signalled once per output multiframe. For example, in the second output frame, the trunk activity status for trunks 9-16 may be signalled. To show the broad utility of our invention, we assume that trunks 9, 10, 11 and 12, which were active in the first frame, are signalled as inactive in the second frame. See, for example, the ASV and BWC2 signals for frame $F_2$ in FIG. 4. Accordingly, assume the second frame in our example has 26 active trunks vis-a-vis the 30 active trunks in the first frame. Hence, in the second frame, a different array obtains than that illustrated in FIG. 5 for the first frame, the different array being illustrated in FIG. 6. Also, and in accord with the principles of our invention, the read starting point for assigning bits in the interleaving of the data field of the second frame is rotated to obtain a more uniform signal degradation. The illustrative read starting point is column-wise rotated to a trunk from a second group of active trunks, here to trunk 5, which is depthwise written at column 2, row 1 of the array. Specifically, in the second frame, bit one of the character from trunk 5 is the first bit read from the array for interleaving in the output frame. Next, bit one of the character from trunk 162 is read from the array. Inasmuch as there are no active trunk characters in rows 3-8 of column 2, the read sequence overflows to column 3, row 1 where the next bit is bit one of the character from trunk 6, to be followed by bit one of the character from trunk 7, etc. In summary, characters are read from the array and assigned for interleaving in the second frame of the output multiframe in the following rotated order of active trunks:

5, 162, 6, 7, 8, 13 through 31, 4, 161. In a parallel fashion, as to frames 3 through 24, the read starting point is column-wise rotated to a trunk in each of the groups formed by columns 3 through 24, respectively.

From the above description, it is clear that the predetermined order of assigning characters is adaptively adjusted by being rotated according to which trunks are active. This improved rotation arrangement obtains a more uniform signal degradation during overload when contrasted with the prior art, where the priority rotation is relative to all trunks, whether active or inactive.

Having described the operation of the address register with the aid of a matrix array, we now turn to a description of illustrative timing signals, some of which we have previously discussed, for controlling an address register. Our illustrative address register is responsive to three sets of prior art timing signals, shown respectively in FIGS. 2, 3 and 4.

Figure 2:
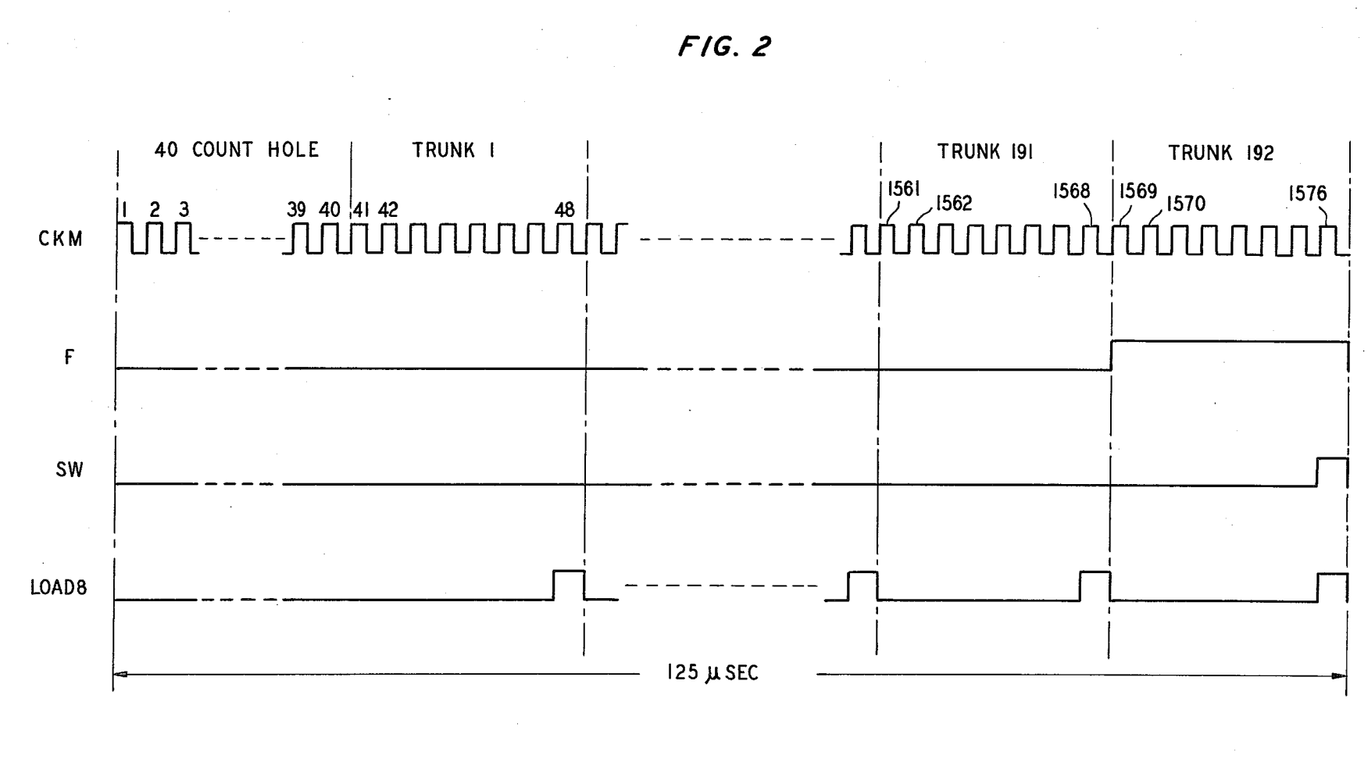
FIG. 2 illustrates a plurality of intraframe clock timing signals usable in the illustrative rotator of FIG. 1.

The first set includes four intraframe signals, labelled in FIG. 2 as CKM, F, SW and LOAD8. Turning now to FIG. 2, the first timing signal is master clock signal CKM, to which the remaining intraframe signals are synchronized. The CKM signal is provided at a nominal clock pulse rate of 12,608 MHz, or four times the illustrative transmitter output bit rate. Since each 193-bit input frame arrives at a nominal bit rate of 1.544 Mb/s, and assuming concurrent arrival at each of eight input terminals, characters from up to 192 active trunks are processed in about 125 microseconds. By straightforward algebra, it is clear that the master clock signal CKM includes a 1576 clock pulses during a 125 microsecond time period. However, since the depth of each input digital character is eight bits and since there are 192 trunks, only (8 × 192 =) 1536 pulses are usually required during the time period. The difference, represented by a CKM clock pulse count of 40, is so identified in FIG. 2 as "40 COUNT HOLE". The second intraframe signal is framing signal F for indicating framing among a plurality of 125 microsecond time periods. Illustratively, framing signal F is a logic one signal during CKM clock pulse counts 1569–1576; else signal F is a logic zero. The logic one occurs concurrently with the processing of a digital character from trunk 192. The third intraframe signal, labelled SW, parallels framing signal F. Specifically, the SW signal is a logic one during CKM clock pulse, 1576, i.e., during the processing of bit eight from trunk 192; else signal SW is a logic zero. Finally, the fourth intraframe signal is the LOAD 8 signal, which is logic one during processing of the eighth bit of a character from each of the 192 trunks; otherwise LOAD8 is the logic zero. So much for the synchronized, intraframe timing signals, which are substantially homogenous from one frame to the next.

Figure 3:
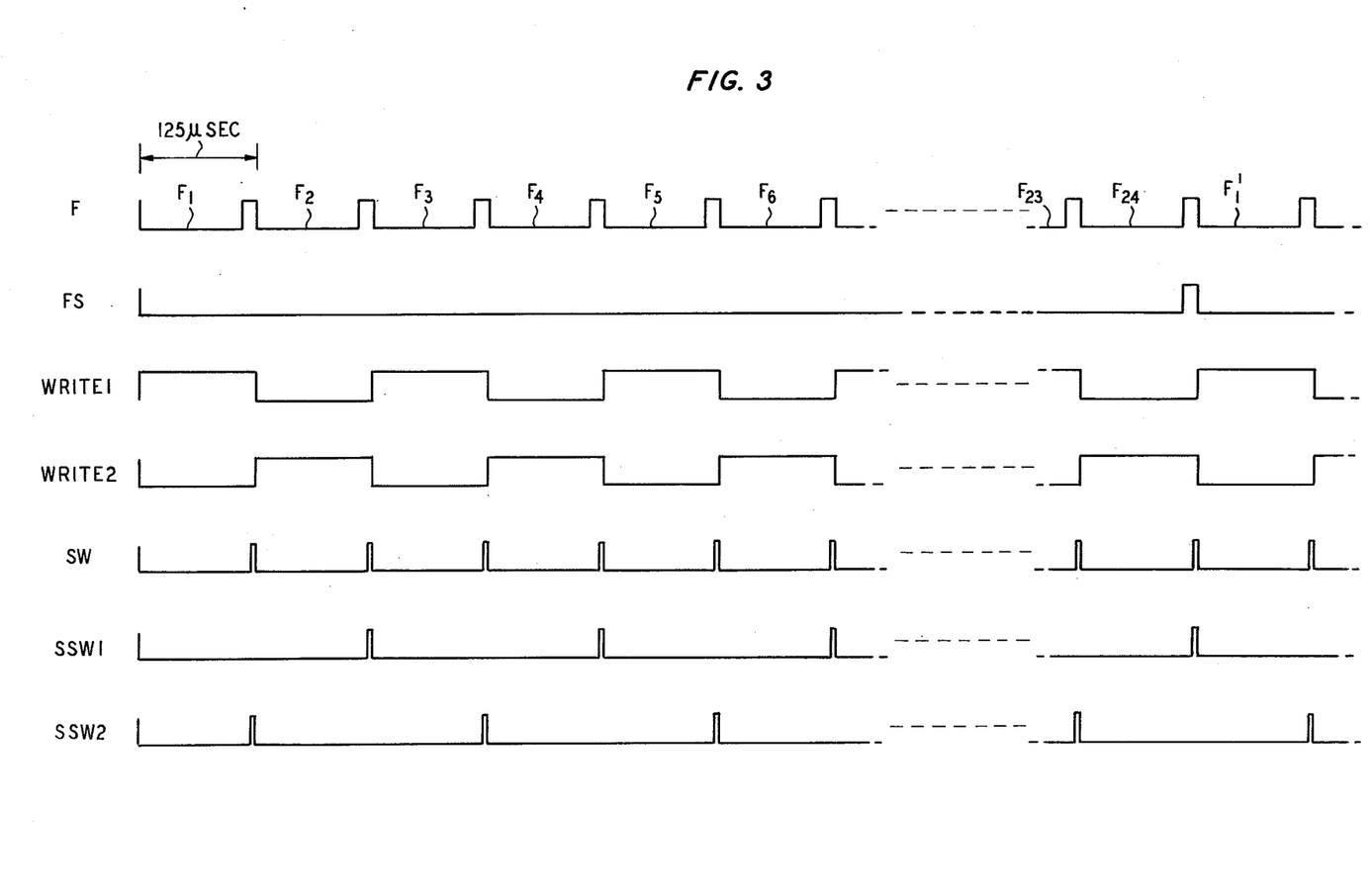
FIG. 3 illustrates a plurality of interframe clock timing signals usable in the illustrative rotator of FIG. 1.

The second set includes five inter-frame signals, identified as WRITE1, WRITE2, SWW1, SWW2, and FS. The second group of timing signals is illustrated in FIG. 3, in which is also repeated, albeit on a different scale for purposes of comparison, the F and SW timing signals. The interframe signals are for controlling the alternate writing and reading of the memories. In particular, as aforementioned, the WRITE1, and its complement the WRITE2, signal alternates from one frame to a next frame between one logic state and a second logic state. In similar manner, the SWW1 and SWW2 timing signals, derived from and alternately coincident with the SW timing signal, alternate from one frame as the SW signal to the next adjacent frame as a logic zero signal. Finally, signal FS is a second framing signal for signaling the framing status of an output multiframe. Inasmuch as each output frame is assumed to consist of 394 bits transmitted at a 3.152 Mb/s rate, each output frame also has a time period of about 125 microseconds. Hence, multiframe framing signal FS is equal to framing signal F during frame 24 of the output multiframe; else FS is a logic zero.

Figure 4:
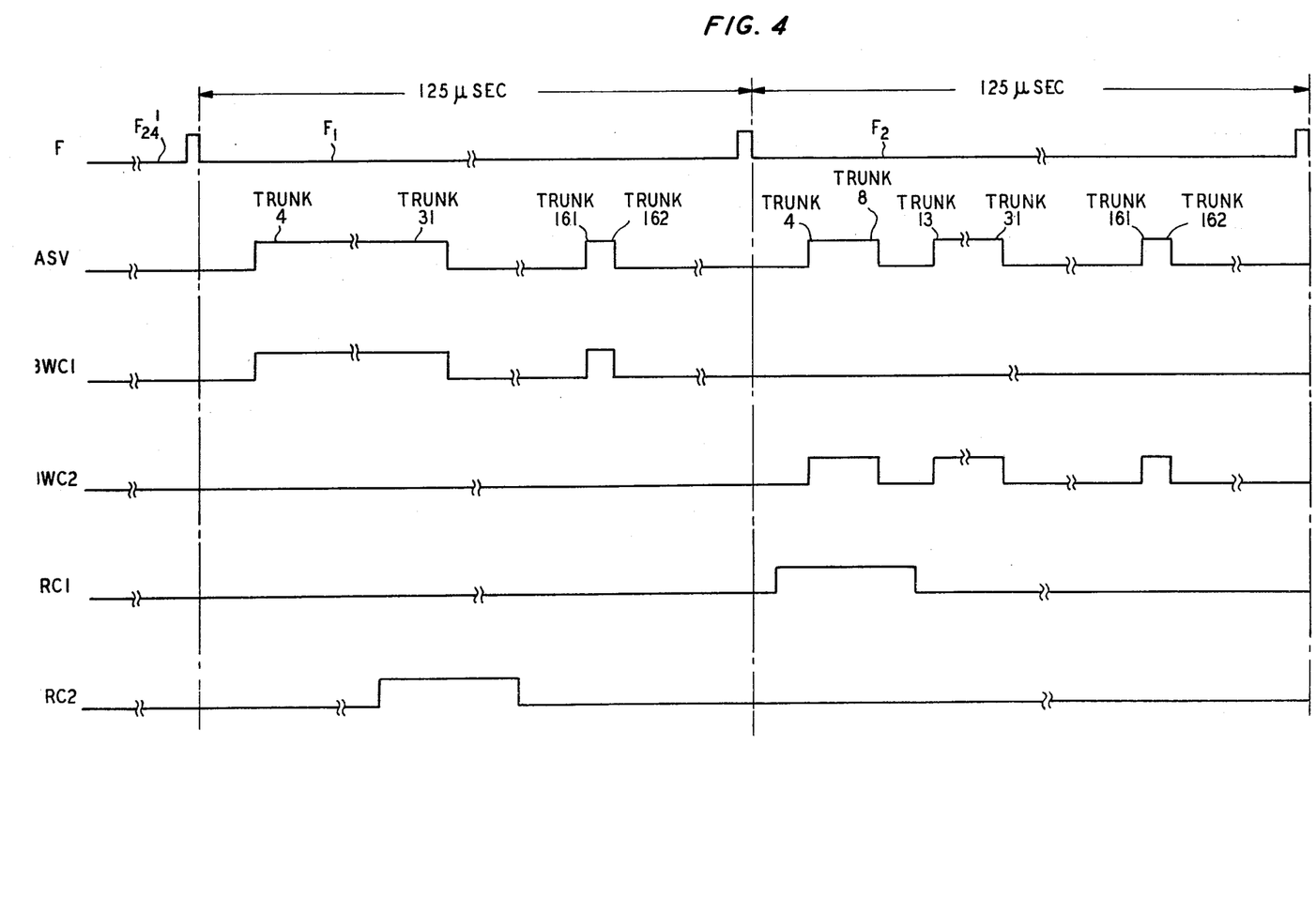
FIG. 4 illustrates a plurality of nondeterministic clock timing signals usable in the illustrative rotator of FIG. 1.

From the above, it is clear that the intraframe signals of FIG. 2 and the interframe signals of FIG. 3 are synchronized with master clock signal CKM. On the other hand, the third set includes five nondeterministic signals, labelled ASV, BWC1, BWC2, WRC1, and WRC2. Turning to FIG. 4 and except for framing signal F, which is there repeated for reference, each of the five illustrative nondeterministic timing signals is depedent upon an external stimulus. For example, the trunk activity status signal ASV is extended from a speech detector, not shown, as a logic one when a trunk is detected as active; else it is a logic zero. Although nondeterministic in the sense of being responsive to an external stimulus and thus unpredictable as to occurrence, the ASV signal, when provided, is a logic one, coincident with processing the eight-bit character from the corresponding active trunk, i.e., within a FIG. 2 frame, the logic one ASV signal is synchronized with the eight CKM clock pulses for the active trunk. The previously mentioned BWC1 timing signal for enabling memory 620-1 to be written is a logic one responsive to the coincidence to a logic one ASV and a logic one WRITE 1 signal. In a similar manner, the BWC2 signal for enabling memory 620-2 to be written is a logic one responsive to the coincidence of a logic one ASV and a logic one WRITE2 signal. Finally, as in the prior art, the WRC1 and WRC2 signals are logic ones for signalling that the digital characters may be read from memory 620-1 and 620-2, respectively, and interleaved into the data field of a respective output frame; otherwise the WRC1 and WRC2 signals are logic zeroes. So much for a review of the prior art timing signals to which our improved address register is responsive.

Returning now to our illustrative embodiment of FIG. 1. As aforementioned, each character memory is sufficient in size to buffer an eight-bit character from each of 192 active trunks. Thus, even though (192 × 8 =) 1536 bits may be used, each memory may be a standard 2048-bit random access memory, a bit location of which is addressable by an eleven-bit address. The address is extended in parallel from address register 630-1 to memory 620-1 over cable 623-1. Cable 623-1 includes eleven leads, labelled A0, A1, . . . , A10, for extending a three-bit row address over leads A0, A1, and A2; a five-bit column address over leads A3, A4, A5, A6, and A7; and a three-bit depth address over leads A8, A9, and A10. Within address register 630-1 three controls are employed for providing the row, column and depth addresses corresponding to the three dimensions of the array. Specifically, row control 100 provides the row address for extension, column control 200 provides the column address, and depth control 300 provides the depth address.

We now more particularly describe each of the register controls. Our description is first as to a write cycle and then as to a read cycle and, within a cycle, the initializing of the register followed by the incrementing of its controls.

In initializing a register for a write cycle, three counters are reset to provide the address for row 1, column 1, depth 1, where, in our illustrative embodiment, writing is assumed to commence and which is addressable using an eleven-bit address "000 00000 001". In particular, four-bit depth counter 310 of depth control 300, is reset to provide a four-bit output state "0001", the high order logic zero being fed back over lead 314, for reasons hereinafter described. The reset state is extended to the IN input thereof from apparatus 315 responsive to a logic zero at the counter LD load input. The logic zero is extended from an output of AND gate 350 responsive to a logic one SW signal provided to a first, inverting input thereof. Next we describe the resetting of column control 200 to provide a five-bit output state "00000". The reset state is provided by clearing counter 210 responsive to a logic one SWW1 timing signal extended to an inverting CLR clear input thereof. Finally, as to resetting row control 100 to provide a four-bit output state "1000", the high order logic one being fed back over lead 154 to a first input of comparator 150. The reset state is extended to the IN input of row counter 110 from apparatus 115 responsive to a logic zero at the counter LD load input. The logic zero is extended from an output of AND gate 160 responsive to a logic one SW signal provided to a first inverting input of gate 160. So much for initializing a register by resetting the controls thereof.

In incrementing a register during a write cycle, the respective controls are both selected and enabled for incrementing. Each of the controls is selected for writing responsive to a logic one detected at the EN2 input of a respective counter. Specifically, an output of NAND gate 170 is extended to the EN2 input of row counter 110, while an output of NAND gate 370 is extended jointly to the EN2 inputs of column counter 210 and depth counter 310. Hence, responsive to a logic one WRITE1 signal, extended to respective first, inverting inputs of NAND gates 170 and 370, a logic one selecting signal is provided to the respective counter EN2 inputs, thereby selecting the controls for incrementing during the write cycle.

A control is enabled for writing responsive to a logic one detected at the EN1 input of a respective counter. For example, an output of NAND gate 130 is extended to the EN1 input of row counter 170, an output of NAND gate 230 to the EN1 input of column counter 210, and an output of NAND gate 360 to the EN1 input of depth counter 310. It will be recollected that the manner of progressing through the array differs between writing and reading. Hence, the manner of providing the respective addresses differs between the write cycle and the read cycle. In particular, writing is first by depth, then by column and then by row. Accordingly, during a write cycle, depth counter 310 of depth control 300 is incremented faster than column counter 210 of column counter 200 which, in turn, is incremented faster than row counter 110 of row control 100. Hence, in our illustrative embodiment, responsive to a logic one WRITE1 signal, extended to a first, inverting input of NAND gate 360, a logic one enabling signal is provided to the EN1 input of depth counter 310. Inasmuch as the EN1 input is a logic one during the entire write cycle depth counter 310 is incremented faster than the column and row counters, it being incremented responsive to each CKM master clock pulse detected at its CLK clock input. As to slower incrementing column counter 210, it will be recalled that the LOAD8 signal is a logic one during the processing of the eighth bit of an input character. Hence, upon detection of the coincidence of an active trunk, i.e., the ASV signal is a logic one, and the eighth bit of an input character, i.e., the LOAD8 signal is a logic one, the ASV and LOAD8 signals being extended to respective inputs of NAND gate 220, a logic zero output of NAND gate 220 is inverted by NAND gate 230 thereby making available a logic one for enabling column counter 210 to be incremented. As to still slower row counter 110, upon detection of column 24 having been written, a logic one signal is extended from a MAX output of column counter 210 over lead 216 to a first input of NAND gate 120. Second and third inputs to gate 120 are the ASV and LOAD8 signals. Hence, upon detection of the coincidence of an active trunk and the eighth bit of a character having been written in column 24 of the array, a logic zero is extended from an output of gate 120 and is inverted by NAND 130 thereby making available a logic one for enabling row counter 110 to be incremented. As a result, the aforementioned order of incrementing the counters during a write cycle is obtained.

Still more particularly, after depth counter 310 has been reset to provide a reset output state "0001", the counter may be incremented. That is, responsive to each pulse of the CKM master clock signal, depth counter 310 is incremented by being advanced once for each bit to be written in an addressed memory location. As mentioned, depth counter 310 is enabled to be incremented responsive to a logic one detected at its EN1 enable input. The enabling logic one input is extended from an output of NAND gate 360 responsive to a logic one WRITE1 signal provided to a first, inverting input thereof. When the eighth bit is written, the output of counter 310 is "1000". The high order logic one is fed back via lead 314 to a first input of NAND gate 320. A second input of NAND gate 320 is the WRITE signal, which, as aforementioned, is a logic one while memory 620-1 is being written. Responsive to the coincidence of the two logic ones, a logic zero is extended from an output of gate 320 through AND gate 350. As a result, a logic zero is provided to the LD load input of depth counter 310 for resetting the output thereof to "0001", thereby control 300 is reinitialized for the next character to be written. From the above discussion, it is clear that, after a character has been depthwise written, five-bit column counter 210 is to be incremented by being advanced a count of one, thereby providing at its output the five bit address of the next column to be written. Accordingly, when a trunk is active, the ASV activity status signal thereof is extended as a logic one to a first input of NAND gate 220. Also, the LOAD8 intraframe timing signal is extended to a second input of NAND gate 220. As aforedescribed, the LOAD8 signal is a logic one during the writing of the eighth bit of a character. Hence, responsive to the eighth bit having been written, column counter 210 is enabled to be advanced responsive to a logic zero output of gate 220, which is inverted by NAND gate 230, the inverted signal being extended as a logic one to the EN1 enable input of column counter 210. When enabled, column counter 210 is advanced upon detection of the next CKM master clock pulse at the CLK clock input thereof. Thereby, the five bit parallel address of the next column to be written is provided at an output of column counter 210. The column address is fed back over cable 253 to a first input of each of comparators 260 and 280 as well as of latch 270 for use during a read cycle in detecting the last written column.

As aforedescribed, the left-to-right writing continues until column 24 is detected as having been depthwise written, whereupon column counter 210 is reset and slower row control 100 is incremented. In particular, upon detecting column 24, a logic one is extended from the MAX output of column counter 210 over lead 216 to row control 100 and therein to a first input of NAND gate of 120. Second and third inputs of NAND gate 120 are the ASV trunk activity status signal and the LOAD8 timing signal. Upon detection of the coincidence of a logic one at the three inputs of NAND gate 120, a logic zero output thereof is inverted by NAND gate 130, the inverted signal being extended as a logic one to an EN1 enable input of row counter 110. When enabled, row counter 110 is incremented upon detection of the next CKM clock pulse at its CLK clock input. In that manner, row counter 110 is incremented after a character has been depthwise written to provide at its output the three bit parallel address of the next row to be written. Also, counter 140 is selected responsive to a logic one WRITE1 signal at its EN1 input and is enabled responsive to a logic one output of NAND gate 130. Thereby, counter 140 is selected and enabled to be incremented during a write cycle so as to provide at an output the address of the last row written, which address is extended to a third input of comparator 150 for use in a read cycle.

Summarily, from the above, it should be clear that our illustrative embodiment includes apparatus for writing a character in a character memory, the writing being first by depth, then by column and then by row.

We now describe a read cycle. In initializing a register for reading, the three counters are initialized to provide an adaptively adjusted address over cable 623-1, which address is rotated from one frame to a second frame. In our illustrative embodiment, row counter 110 and depth counter 310 are initialized for reading in substantially the same manner as the two are reset for writing. That is, responsive to a logic one SW signal at the first, inverting inputs of NAND gates 160 and 350, a logic zero is extended to the LD load input of counters 110 and 310 for resetting the respective output states to "1000" and "0001" by way of apparatus 115 and 315. However, in our illustrative embodiment, initializing column counter 210 is an altogether different matter. In particular, priority rotation counter 240 is employed in the adaptive adjustment of the read starting point. Specifically, responsive to the logic one of multiframe framing signal FS, priority counter 240 is reset to provide a rotated column address "00000", the reset occurring at the end of an output multiframe for initializing the register for the next read cycle. Thereafter, priority counter 240, and hence the rotated column address, is incremented responsive to a logic one SW signal, the SW signal being provided to an EN enable input of priority counter 240, Inasmuch as the logic one of the SW signal occurs once per output frame, priority counter 240 is advanced each output frame and is reset after the 24th output frame. The rotated column address is extended over cable 215 from an output of priority counter 240 jointly to an input to an IN input of latch 250 and an IN input of column counter 210. As to latch 250, responsive to a logic one SW signal provided to its LD load input, the rotated address on lead 215 is loaded into latch 250. Also, the rotated column address on cable 215 is loaded into column counter 210 for initializing same for the read cycle responsive to the logic one of the SWW2 signal detected at an inverting LD load input thereof. Stemming from a delay in the incrementing of priority counter 240, the address loaded into latch 250 is the current rotated column address less one while the address loaded into column counter 210 is the current address. The reason, therefore, will shortly be made more clear. Thereby, the row, column and depth counter are initialized for reading.

In incrementing a register for reading it will be recalled that reading is first by row, then by column, and then by depth. Accordingly, during a read cycle, row counter 110 is incremented faster than column counter 210, which, in turn, is incremented faster than depth counter 310. However, the incrementing is nonoperative for reading until the respective controls have been selected and enabled. In reading, the controls are selected and enabled in a manner opposite to that for a write cycle. Specifically, the controls of register 630-1 are selected for reading responsive to a logic one EN1 signal and enabled for reading responsive to a logic one EN2 signal.

As to selecting row control 100, a logic zero WRITE1 signal, extended to a first input of NAND gate 130, is inverted thereby and provided to the EN1 input of row counter 110 as a logic one. It should be observed that counter 140 is not selected during a read cycle, its EN1 input being a logic zero WRITE1 signal. Hence, during the read cycle, the output of counter 140 remains as the address of the last written row. As to enabling row control 100, a logic one WRC1 signal is provided to a second, inverting input of NAND gate 170 during a read cycle. A resultant logic one output of gate 170 is extended to the EN2 input of row counter 110. When so selected and enabled, row counter 110 is incremented responsive to each CKM master clock pulse detected at its CLK clock input. The row address output of counter 110, extended over cable 623-1 on leads A0, A1 and A2, is fed back over cable 153 to a second input of comparator 150. A third input to comparator 150 is provided from an output of four-bit counter 140, the output being the address of the row last written in the array. When the value of the third input is equal to the value of the four-bit output row address, which is supplied by row counter 110 and extended to the first and second inputs of comparator 150, the equality indicating the last written row has been read, a logic one output of comparator 150 is extended over lead 151 to a first input of NAND gate 340. Second and third inputs to gate 340 are the WRC1 and an inverted WRITE1 signal. Hence, while reading and upon detection of the last written row having been read, the coincidence being detected by NAND gate 340, a logic zero output thereof is inverted by NAND gate 370 for extending an enabling logic one over lead 371 to the EN2 inputs of column counter 210 and depth counter 310. Thereafter slower column counter 210 is incremented responsive to the next CKM master clock signal detected at its CLK clock input, it being evident that a logic one selecting signal has been provided to the EN1 input of counter 210 responsive to a logic zero WRITE1 signal provided to and inverted by NAND gate 230. The column address is fed back over cable 253 to the first input of comparator 280. A second input to comparator 280 is the address of the last written column, which is extended thereto from an output of latch 270. When the first and second inputs are equal, a logic one is extended from an output of comparator 280 over lead 281 to a fourth input of comparator 150 for indicating the last written column has been read. As mentioned, the enabling logic one is provided over lead 371 to the EN2 input of depth counter 310 for enabling depth control 300. However, depth counter 310 is not incremented until it is also selected, the selecting being responsive to a logic one detected at its EN1 input. Also as aforedescribed, depth counter 310 is incremented for reading a second bit of a character after the first bit of all characters written in the array have been read. The enabling logic one at its EN2 input indicates the last row has been read while a selecting logic one at its EN1 input indicates the last column has been read. In our embodiment, the selecting EN1 logic one obtains as follows. The rotated read starting point column address is loaded in column counter 210 during initialization. After a last written row is read, column counter 210 is incremented. The column address output of counter 210 is fed back over cable 253 to a first input of comparator 260. A second input to comparator 260 is the current rotated column address less one as extended thereto over cable 251 from an output of latch 250. Upon detection of equality at the two inputs, a logic one is extended from an output of comparator 260 over lead 261 to a first input of NAND gate 330. A second, inverting input to NAND gate 330 is the high order bit of depth counter 310, which is extended thereto over lead 314. Until the eighth bit of each written character is read, the high order bit is a logic zero. Therefore, a logic zero is extended from an output of NAND gate 330, inverted by NAND gate 360, for providing the logic one selecting signal to the EN1 input of depth counter 310 for it to be incremented. As an aside, in our illustrative embodiment, we have assumed an eight bit input character. Hence, it should go without mention that depth counter 310 need not be incremented beyond the output state "1000".

Thus, in summary, turning to row control 100, four-bit row counter 110 is reset to provide a parallel output state "1000", the state being extended thereto from apparatus 115 responsive to a logic zero at the counter LD load input. The loading logic zero is extended from an output of AND gate 160 responsive to a logic one SW signal provided to an inverting input thereof. Thereafter, row counter 110 is selected and enabled to be incremented responsive respectively to a logic one at its EN1 and EN2 inputs. The EN1 logic one is extended from an output of NAND gate 130; and the EN2 logic one from an output of NAND gate 170. When selected and enabled, row counter 110 is advanced upon detection of a CKM master clock pulse, the counter being incremented once for each bit to be read from the memory. When the last row in a column has been read, a logic one is extended over lead 151 from an output of comparator 150 to a first input of depth control NAND gate 340. Of course, when memory 620-1 is enabled for reading, the WRITE1 timing signal is a logic zero. Also, as aforementioned, the WRC1 timing signal is a logic one during the reading of memory 620-1 for interleaving bits in the data field of the output frame. The WRC1 timing signal is provided to a second input of NAND gate 340; while the WRITE1 timing signal is provided to a third, inverting input thereof. Upon the detection of the coincidence of three logic ones at the inputs of gate 340, a logic zero output is extended to a second input of NAND gate 370, inverted thereby, the inverted signal being extended as a logic one over lead 371 to an EN2 enable input of column counter 210 for advancing column counter 210 by a count of one. Concurrently, the logic zero output of NAND gate 340 is extended through a second input of AND gate 160 to the LD load input of row counter 110 for resetting the output thereof to a state "1000". As to initializing column counter 210, priority counter 240 is cleared responsive to a logic one FS multiframe framing signal provided to its CLR clear input. Hence, at the beginning of each output multiframe, counter 240 is initialized to provide at its output the address "00000". Thereafter, counter 240 is incremented for each frame responsive to a logic one SW timing signal provided to its EN enable input. The output of counter 240 is the rotated read starting point column address. The rotated column address is then extended to the IN input of column counter 210. After the first bit of each character from an active trunk has been read and interleaved in the output data field, the output address of column counter 210 is compared by comparator 260 with the rotated starting column address less one, the latter address being extended to comparator 260 from an output of latch 250. Responsive to an equal comparison, a logic one is extended from an output of comparator 260 over lead 261 through NAND gates 330 and 360 onto the EN1 enable input of depth counter 310 for enabling depth counter 310 to be incremented upon detection of the next CKM clock pulse. Thereby, the depth counter output represents the address the second bit of each character to be read from the array.

Summarily, from the above, it should be clear that our illustrative embodiment includes apparatus for reading a character from a character memory, the reading being first by row, then by column and then by depth.

Although our invention has been described and illustrated in detail with respect to a character buffer usable in a DSI data transmitter, wherein characters are written in a first order and read in a second, adaptively adjusted order, it is to be understood that the same is by way of illustration and not by way of limitation. For example, the characters could equally be written according to an adaptively adjusted order and read according to a second order. The spirit and scope of our invention is limited only by the terms of the appended claims.

We claim:

1. Apparatus for providing a priority rotation to digitized message samples;
   said apparatus including an input terminal adapted to receive said samples from a plurality of trunks;
   activity status means for signalling which ones of said trunks are active and which ones are inactive;
   means for buffering said received samples;
   means for assigning active samples from said buffer to a frame;
   an output terminal adapted to transmit said frame;
   overload mitigating means operable on said assigned samples during overload; and
   CHARACTERIZED IN THAT said apparatus further comprises;
   means responsive to active trunks for adaptively adjusting a sample assignment starting point,
   said starting point being adjusted on a frame-by-frame basis according to which trunks are active during said frame whereby a substantially uniform signal degradation is obtained during overload.

2. The apparatus defined in claim 1 wherein said buffer means includes means for storing a message sample in a multidimensional array; and
   wherein said adaptively adjusted means includes means coupled to said buffer means for extending samples from said array to said frame in a rotated order, said rotated order being responsive to which trunks are active.

3. The apparatus defined in claim 2 wherein said storing means includes means for writing said message samples in a memory, said memory for storing said multidimensional array, said writing occurring faster in a first dimension of said array than in a second dimension thereof.

4. The apparatus defined in claim 3 wherein said extending means includes means for reading said written message samples, said reading occurring faster in said second dimension of said array than in said first dimension thereof.

5. The apparatus defined in claim 1 wherein said adaptively adjusted means includes means for assigning a trunk to one of a plurality of groups of active trunks;
   means coupled to said sample assigning means for selecting said starting point from a group; and
   means for rotating said starting point among said plurality of trunk groups on a frame-by-frame basis.

6. Digital communication apparatus for communicating message samples between a transmitting station and a receiving station over a first plurality of trunks through a second plurality of channels;
   said apparatus including an input terminal adapted to receive a message sample from a trunk;

activity status means for signaling whether said trunk is active or nonactive;

buffer means for forming a multibit frame, said forming means including means for assigning said sample to a frame;

means for extending said frame to an output terminal, said output terminal adapted to transmit said frame;

means operable upon said sample for mitigating overload;

means for rotating the order of sample assignment from one frame to a second frame and CHARACTERIZED IN THAT said apparatus further comprises;

means responsive to said activity status means for assigning an active trunk sample to one of a plurality of groups, each group having one or more active trunk samples, said order rotating means including means operable on a frame-by-frame basis for rotating a starting point for said sample assignment among said groups in a predetermined order; said predetermined order being adjusted in a prefixed manner from one frame to a second frame responsive to which ones of said trunks are active during the frame in which said multibit frame is formed whereby signal degradation is substantially uniform among active trunks.

* * * * *